United States Patent
Ammicht et al.

(10) Patent No.: US 6,651,043 B2
(45) Date of Patent: *Nov. 18, 2003

(54) USER BARGE-IN ENABLEMENT IN LARGE VOCABULARY SPEECH RECOGNITION SYSTEMS

(75) Inventors: Egbert Ammicht, Budd Lake, NJ (US); Allen Louis Gorin, Berkeley Heights, NJ (US)

(73) Assignee: AT&T Corp., Budminster, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/825,020

(22) Filed: Apr. 3, 2001

(65) Prior Publication Data

US 2001/0011217 A1 Aug. 2, 2001

Related U.S. Application Data

(63) Continuation of application No. 09/223,945, filed on Dec. 31, 1998.

(51) Int. Cl.$^7$ ............................................. G01L 15/04
(52) U.S. Cl. ..................... 704/275; 704/251; 704/231; 704/233
(58) Field of Search ................. 704/231, 233, 704/270, 272, 275, 253, 254, 251, 244, 228, 214

(56) References Cited

U.S. PATENT DOCUMENTS

| 4,825,384 | A | * | 4/1989 | Sakurai | 704/275 |
| 5,675,707 | A | * | 10/1997 | Gorin et al. | 704/251 |
| 5,765,130 | A | * | 6/1998 | Nguyen | 704/231 |
| 5,794,193 | A | * | 8/1998 | Gorin | 704/250 |
| 6,246,986 | B1 | * | 6/2001 | Ammicht et al. | 704/270 |

FOREIGN PATENT DOCUMENTS

EP  0 763 817 A2  *  3/1997  ............. G01L/5/06

* cited by examiner

Primary Examiner—Tālivaldis Ivars Šmits
Assistant Examiner—Abul K. Azad
(74) Attorney, Agent, or Firm—Henry Brendzel

(57) ABSTRACT

An interactive voice response unit which provides beneficial operation by including means to handle unconstrained input such as natural speech and to allow barge-in includes a prompter, a recognizer of speech signals, a meaningful phrase detector and classifier, and a turn-taking module, all under control of a dialog manager. In the course of listening to user input while outputting a voiced message, the voice response unit processes the received signal and ascertains whether it is receiving an utterance that is intended to interrupt the prompt, or merely noise or an utterance that is not meant to be used by the arrangement. The unit is sensitive to the speed and context of the speech provided by the user and is thus able to distinguish between a situation where a speaker is merely pausing and a situation where a speaker is done speaking.

25 Claims, 2 Drawing Sheets

| MUT INF | PHRASE FRAGMENTS | MAX PROB | ACTION |
|---|---|---|---|
| 7.4 | MADE A LONG DISTANCE | 0.93 | CREDIT |
| 7.3 | LONG DISTANCE | 0.55 | CREDIT |
| 7.1 | I WOULD LIKE | 0.24 | |
| 6.9 | AREA CODE | 0.65 | AREA CODE |
| 6.3 | COULD YOU TELL ME | 0.37 | |
| 5.6 | THE AREA CODE FOR | 0.92 | AREA CODE |
| 5.3 | I AM TRYING | 0.33 | |
| 5.0 | A WRONG NUMBER | 0.98 | CREDIT |
| 4.9 | A LONG DISTANCE CALL | 0.62 | CREDIT |
| 4.8 | THE WRONG NUMBER | 0.98 | CREDIT |
| 4.8 | A NUMBER IN | 0.29 | |
| 4.4 | I AM TRYING TO | 0.33 | |
| 4.3 | LONG DISTANCE CALL | 0.62 | CREDIT |
| 4.3 | TRYING TO | 0.30 | |
| 4.3 | I JUST MADE A | 0.93 | CREDIT |
| 4.1 | I'D LIKE TO | 0.18 | |
| 4.0 | TO MAKE A CALL | 0.24 | |

USER BARGE-IN ENABLEMENT IN LARGE VOCABULARY SPEECH RECOGNITION SYSTEMS

RELATED APPLICATIONS

This is a continuation application of an application bearing the Ser. No. 09/223,945, filed Dec. 31, 1998.

BACKGROUND OF THE INVENTION

This invention relates to speech processing, and more particularly to "man-machine" interactions where the machine is an arrangement that provides prompts to users and reacts to user responses in the form of natural speech as well as in the form of DTMF machine understands and acts upon what people actually say, in contrast to what one or other useful signals. When a machine responds to natural speech, it means that the would like them to say.

In communications networks there are many instances where a caller who places a call is connected to an interactive voice response unit (VRU) and is asked to interact with that unit. In the prior art, such interaction is generally carried out via a plurality of menu choices that must be selected by designated signals. Typically, the user is requested to depress an appropriate key on the user's telephone set keypad. In some cases, the VRU includes a speech recognizer that allows the user to pronounce such the digits, such as "one," "two," etc., or a limited number of specified command words, such as "operator," or a command phrase such as "collect call." In many cases such menu-based interactions involve multi-tiered menus. Alas, multi-tiered menu structures are generally unpopular with users, and have proven to be remarkably inefficient at achieving the desired objective. Some studies have shown that more than 60 percent of the attempts to accomplish a particular task through access via such a multi-tiered menu structure are either terminated without the user having reached the desired objective, or are defaulted to an operator.

In order to address these limitations in the prior art, a means for understanding and acting upon spoken input was disclosed by U.S. Pat. No. 5,794,193, issued on Aug. 11, 1998 to one of the inventors herein (henceforth, the '193 Patent). Because the disclosure contained in the '193 patent is relevant to the understanding of the field to which this invention belongs, the '193 patent is hereby incorporated by reference. For convenience, FIGS. 5 and 6 of the '193 patent are duplicated herein as FIGS. 1 and 2, respectively.

Element 1 of FIG. 1 is charged with developing a collection of meaningful phrases. The meaningful phrases are determined by a grammatical inference algorithm that operates on a predetermined corpus of speech utterances (previously acquired) that are applied to meaningful phrase processor 10. It obtains this collection from a corpus of data that is applied to meaningful phrase processor 10. Each meaningful phrase developed by the grammatical inference algorithm can be characterized as having both a Mutual Information value and a Salience value relative to an associated task objective. Accordingly, processor 10 associates a desired task with each developed meaningful phrase and provides a confidence level that processor 10 has about the binding of the meaningful phrase to the identified task. An illustrative collection of meaningful phrases is shown in FIG. 2 where, for example, the phrase "LONG DISTANCE" is associated with an action that is labeled "CREDIT" and has a confidence level of 0.55, and the phrase "MADE A LONG DISTANCE" is also associated with the "CREDIT" action and has a confidence level of 0.93.

Element 2 of FIG. 1 presents the arrangement for using the information developed by element 1. An input speech signal (analog) is applied to input speech recognizer 15, as well as the collection of meaningful phrases and, with the help of conventional word spotting algorithms, recognizer 15 develops an output when one of the meaningful phrases of the provided collection is found in the input speech signal. The recognized output is applied to classification processor 20 which, based on the confidence level of the applied collection, decides whether to identify the input speech signal with a particular task. This, of course, is based on a threshold that is set in classification processor 20. For example, based on the totality of the data presented in FIG. 2, it would be advisable to set a threshold for assigning an input speech signal to the "CREDIT" task below 0.55. This conclusion is reached because the phrase "LONG DISTANCE" is associated with the "CREDIT" task and there are no meaningful phrases that contain the words "LONG DISTANCE" that have been assigned a different task. The caption "MUT INF" in the first column of FIG. 2 stands for mutual information, which measures the likelihood of co-occurrence of the specified two or more words.

Although the '193 disclosure represents a major advance in the art, additional improvements in man-machine interaction can be realized by overcoming a number of remaining problems. For example, existing systems, while outputting a prompt, are unable to listen to an unconstrained user input and make a determination that the user is trying to communicate something meaningful so that the system could stop speaking and begin taking the user-specified action. The ability to do that can be thought of as the ability to "barge-in."

Also, existing systems, even when finished prompting and in a listening state, do not recognize well when a user is finished speaking, so as to neither wait in silence for too long nor cut the user off too soon.

SUMMARY

The above-mentioned prior art deficiencies are overcome, and other improvements are achieved with an VRU arrangement that listens while prompting and is able to accept a natural, unconstrained, speech input as well as DTMF input or other signals that represent purposeful communication from a user. In the course of listening while prompting, the arrangement processes the received signal and ascertains whether it is receiving a signal, such as an utterance that is intended to interrupt the prompt, or merely noise or an utterance that is not meant to be used by the arrangement. Additionally, the disclosed arrangement is sensitive to the speed and context of the speech provided by the user and is thus able to distinguish between a situation where a speaker is merely pausing to think, and a situation where a speaker is done speaking.

These improvements are realized in an arrangement that includes a prompter, a recognizer of speech signals, a meaningful phrase detector and classifier, and a turn-taking module, all under control of a dialog manager.

The recognizer of speech listens to all incoming signals and determines whether the incoming signal corresponds to a useful signal, such as speech or DTMF signals, or to a not-useful signal. In elementary embodiments, the not-useful signal may correspond to merely a broadband signal (background noise) or even a sudden increase in the broadband signal's volume (e.g., noise from passing vehicular traffic). In more sophisticated embodiments, anything other than the speaker's voice may be classified as noise.

Signals that pass through the recognizer are applied to the meaningful phrase detector which spots words and, eventually, ascertains whether the speech contains a meaningful phrase. While it spots the words and obtains what might be considered partial utterances, it interacts with the turn-taking module to analyze the collected words and the rate at which the collected words are accumulated. Based on this analysis, the arrangement determines whether to expect additional input from the user, or whether to conclude that no additional input is to be expected and action should be taken based on the collected input speech. The action may be to immediately turn off the playing prompt and to proceed with the task requested by the user, to hold on to an inconclusive determination of the user's request and continue playing the prompt, to discard the inconclusive determination, or any other action that is deemed appropriate. Illustratively, another action that may be deemed appropriate to some artisan who implements a system in accordance with the principles disclosed herein, is to turn off the playing prompt when a meaningful partial utterance is found but a determination of user's request is yet inconclusive, and the arrangement continues listening As a result of the aforementioned improvements the disclosed arrangement results in a much more agreeable user-machine interaction. The arrangement would patiently wait for a slow speaker to finish his or her instructions to the arrangement, on the one hand, and it would respond quickly when there is a high probability that user is done speaking.

DETAILED DESCRIPTION

Figure 3:
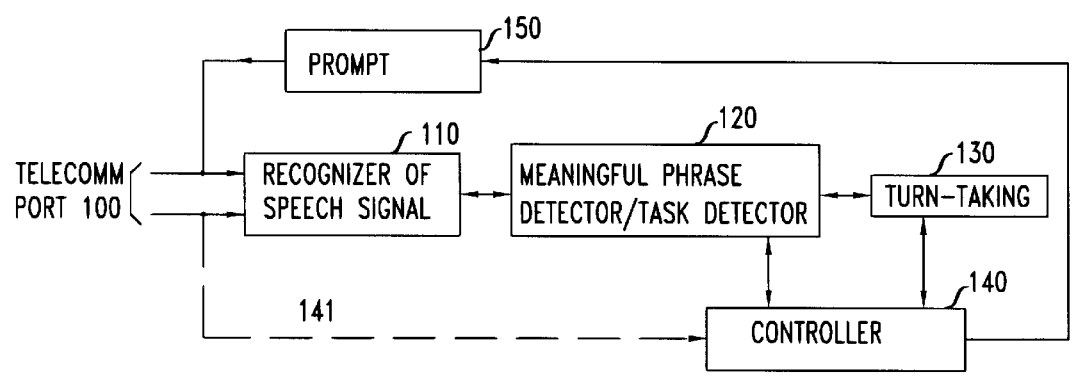
FIG. 3 depicts an interactive voice response arrangement that implements a barge-in implementation arrangement that is timing-sensitive.

FIG. 3 illustrates one implementation of a barge-in arrangement that is designed to help facilitate user-machine interactions in interactive voice response systems (VRUs). The purpose of such an arrangement is twofold. First, the barge-in arrangement allows a machine to ascertain, while it is playing a prompt, whether it is being interrupted by a user uttering meaningful speech, as opposed to simply by noises or language not meant to be heard and used by the machine. Second, the barge-in arrangement distinguishes between a speaker who is merely pausing to think, and a speaker who is done speaking.

Elements 140 and 150 in FIG. 3 are conventional elements of an interactive voice response system. An incoming call at telecommunication port 100 (receiving analog signals or digital signals) is detected by controller 140 via line 141 and that detection initiates a process that results in controller 140 directing prompt unit 150 to send a voice segment to port 100. In typical prior art VRUs, the initial prompt is introductory in nature and presents the caller with a menu of choices. Sometimes that is the only menu presented, but not always. The user responds with a selection, typically, by sending a DTMF (dual tone, multi-frequency) signal that results when a telephone keypad is depressed. The controller detects this signal and, in response thereto, either initiates action, or directs prompt 150 to send another prompt.

Line 141 in FIG. 3 is shown as a dashed line because it is included merely to illustrate the arrangement of prior art VRUs, but in the arrangement disclosed herein it is unnecessary. Instead, the incoming signal of port 100 is applied to the recognizer of speech signal 110. Also in the arrangement disclosed herein, since unconstrained user speech is accommodated, the initial output of prompt unit 150 generally an invitation to the user to state his or her desire. In our embodiment, this invitation takes the form of a "How may I help you?" prompt.

The function of recognizer 10 is to identify and isolate the signal provided at port 100 that the recognizer believes was purposely provided by the caller and is meant for the FIG. 3 arrangement to respond to. Examples of signals that recognizer 110 should not identify as useful signals probably include music, the sound of passing vehicles or planes, background party-conversations, etc. Examples of signals that recognizer 110 should probably find useful are speech and DTMF signals.

The sophistication of recognizer 110 is strictly a function of the sophistication that a designer may wish to impart to a particular embodiment of the FIG. 3 arrangement, and the processing capabilities of the processing elements that follow recognizer 110. The simplest embodiment might include a conventional echo canceler, responsive to both the input signal from port 100 and the prompt signal of element 150 (as shown in FIG. 3), and a filtering processor that determines how much broadband noise signal is likely to be present in the signal arriving from port 100. The echo canceler removes whatever portion of the prompt signal is found in the incoming signal, while the filtering processor appropriately attenuates the incoming signal to remove the influence of the broad band signals on subsequent processing. A more sophisticated embodiment might employ elementary speech recognition technology to test for silence and background noise. A still more sophisticated embodiment may employ speaker verification technology to discriminate against speech from undesirable sources. These algorithms allow the machine to distinguish between, for example, the voice of a user and someone who happens to be speaking in the background. Increasing the sophistication level even further, recognizer 110 might even distinguish between a user who is speaking into the phone and one who has the receiver covered or turned away. Ultimately, perhaps, a really sophisticated recognizer might even remove speech uttered by a caller, if it has no relevance to the tasks at hand. For example, the utterance "Stop hitting your sister" in response to a "May I help you" prompt from a retail store VRU is probably not a meaningful speech segment.

As indicated above, the sophistication that an artisan who implements the FIG. 3 arrangement might impart to recognizer 110 is related to the processing capabilities of the processing elements that follow. The processing element that follows is meaningful phrase detector/task detector 120. Element 120 effectively corresponds to element 2 of FIG. 1. That is, element 120 accepts as input the output signal of recognizer 110 (which hopefully is the useful signal—i.e., speech or DTMF), and ascertains whether the input signal contains meaningful phrases. For example, in response to a prompt "Please enter the telephone number that you wish to reach", the phrase "eight six seven one two three five" is a perfectly acceptable meaningful phrase, as is the DTMF sequence that translates to 8671235. The adjective "effectively" that is employed above with reference to element 120 is so employed because element 120 is improved over element 2 of FIG. 1. First, as indicated above, it recognizes DTMF signals as "meaningful phrases". Second, its classification processor not only converts incoming speech to some designated task, which is data that is to be provided to controller 140, but it also treats the recognized signals as general data that is to be provided to controller 140 without translation. In other words, element 120 converts a speech segment that represented "MADE A LONG DISTANCE CALL" to a direction for controller 140 to route the call to a Credit Operator, and it also sends to controller 140 a sequence of numbers such as 8671235, unaltered, to be used by controller 140 as appropriate. Third, it interacts with turn-taking element 130.

Before turning our attention to the interaction of element 120 with element 130, it may be noted that there is a fine line between the function carried out in recognizer 110 and the function carried out by element 120. In a sense, element 110 is a pre-processor whose function is to reduce the amount of processing that element 120 needs to carry out. Accordingly, if element 120 has a sufficiently large processing capacity, recognizer 110 can be merged into element 120. Nevertheless, it is useful to think in terms of two functions: a first function that keeps useful signals and discards signals that are not useful, and a second function that analyzes the useful signals. The second function also ascertains whether meaning phrases are contained in the applied signal, identifies those meaningful phrases and categorizes, or translates, them into data signals that controller 140 can usefully employ.

The function of element 130 is to assist controller 140 to properly respond to a user input at port 100. The functionality of element 130 is employed in both "normal" operation and "barge-in" operation of the FIG. 3 VRU. By "normal" operation we mean that a user waits for prompt unit 150 to finish its prompt message and than the user responds. By "barge-in" operation we mean that the user does not wait for prompt unit 150 to finish its prompt.

By stating that the function of element 130 is to assist controller 140 to properly respond to user input, what is meant is that element 130, in a sense, modulates the output that is transferred from element 120 to controller 140. This modulation is effected by considering the timing and rate at which words are detected by element 120.

When a signal arrives and element 120 detects, for example, the phrase "LONG DISTANCE," it may make sense to inform controller 140 to assign the call to the CREDTI task; i.e., direct the call to a Credit Operator. The reason this would make sense is because, according to FIG. 2, the phrase "LONG DISTANCE" is meaningful, and with a confidence level of 0.55 the phrase suggests that the caller ought to be routed to a Credit Operator. On the other hand, by waiting a short while and receiving the added "CALL" word, controller 140 can be directed to route the call to the Credit Operator with a confidence level of 0.62. The notion that waiting a short while to determine whether the confidence level of a decision can be enhanced by detecting additional words is applicable at all times. The question, or course, is how much time should one wait before concluding that additional waiting is counterproductive. The answer to this question is different for different users, for different operational situations (whether during normal operation or during barge-in) and for different contextual situations.

One can easily appreciate that some users (perhaps infirm, or confused) respond slowly to interactive voice response prompts, while others respond quickly. It obviously makes sense that the amount of time that the system should wait before finally concluding that a particular task should be finally selected and sent to controller 140 ought to depend on the rate at which words are detected in element 120, and the contextual meaning that is attributed to these words. For example, in the phrase "phone number [pause] aahh [pause] three four seven [long pause] eight eight [short pause] eight eight" the pauses are not unexpected. Accordingly, the words detected in element 120 are fed to turn-taking element 130. Element 130 determines the silence intervals between words and, based on that rate, computes a corresponding wait-time that is fed to element 120 and which prevents element 120 from prematurely settling on a conclusion.

It may be observed that, while it is not required, some artisan might choose to lengthen, or shorten the calculated wait-time based on whether the analyzed response is during normal operation or during barge-in operation.

A second timing consideration involves speech habits. For example, the meaningful phrase "I JUST MADE A" is interpreted as a request for routing to a Credit Operator, and in the table of FIG. 2 the confidence level associated with this phrase is 0.93. This is a high confidence level, and at least some people would agree that the phrase "I JUST MADE", which misses the final word "A", should not be discarded as meaningless even after a fairly substantial wait-time. This is because one might almost expect some people to pause before pronouncing the next phrase (which might be "A CALL TO A WRONG NUMBER") and because the benefit of waiting might be a decision with a high level of confidence. This capability can be imparted to element 130, or to element 120 directly, by assigning (beforehand) a factor that allows a lengthened wait-time at various points of selected meaningful phrases. For example, whatever wait-time is recommended by element 130 to element 120 based on the rate of incoming speech, that time may be lengthened by 20% between the words "MADE" and "A" in the aforementioned example.

A third timing consideration relates to the context within which the response is made. It is contemplated, for instance, that the FIG. 3 arrangement might be used in situations that require more than just routing. In such situations, some specific information may be desired from the user either before the routing or after the routing. To give an example in telephony, the dialog may be as follows: prompt: "MAY I HELP YOU", response: "I MADE A LONG DISTANCE CALL AND WAS CONNECTED TO A WRONG NUMBER." Following the word "DISTANCE," element 120 has a 0.93 confidence level that routing to a Credit Operator is appropriate, sends this information to controller 140 through element 130, and controller 140 proceeds to route the call. Concurrently, controller 140 determines that credit will likely be given to the caller and that a connection to the desired destination would likely be attempted. Advantageously, the FIG. 3 arrangement would be implemented to effectively stop listening and to prompt with "PLEASE STATE THE NUMBER YOU WISH TO REACH". This prompt may be given before any action is taken to transfer the call to the Credit Operator, or concurrently therewith. The expected response to this prompt is at least 7 digits (and when the first digit is a "1", the expected number of digits is 10 additional digits). In light of this knowledge, if the user enters 6 digits and then pauses for more than some nominal time, it would make little sense to reach a conclusion that the user failed to enter a full and valid number. Rather, it would make more sense to conclude that since 7 digits are expected and 6 digits were provided, an extra long wait-time should be provided before a conclusion is reached that the user has failed to provide the requisite number of digits. To give an example from the financial industry, it is not uncommon for people to obtain information about their bank accounts by phone, and a prompt like "PLEASE ENTER YOUR ACCOUNT NUMBER" clearly calls for a specific input. This information would be gathered even before the call is routed to a database server that would provide the caller with the desired information.

Controller 140 can specify to element 130 what information is expected and direct element 130 to provide extra wait-time until the expected information is obtained. In a simpler embodiment, controller 140 simply sends a control signal to element 120 directing it to not reset itself in preparation for the detection of a next meaningful phrase until controller 140 is satisfied. When controller 140 is satisfied that all of the requested information was provided, or is likely not to be provided at all (because even the extra long wait-time has elapsed without the expected input) controller 140 sends a reset signal that releases element 120 to discard the collected words and to start anew.

It should be noted that during normal operation, when controller 140 receives the necessary information, it proceeds with whatever action is called for, including the initiation of another prompt. In the barge-in mode of operation, controller 140 also abruptly terminates the prompt as soon as it receives the expected input from element 130.

A fourth timing consideration relates to what might be considered a politeness factor. By now, people are pretty much used to make menu choices by depressing keys on a telephone instrument's keypad. This is a very succinct form of communication. When people are offered the opportunity to speak, it is unlikely that people will respond as succinctly. Some people will, likely, insert some polite phrases in their speech, such as "PLEASE", or "I DON'T WANT TO BOTHER YOU, BUT . . . ," and some will add preliminary sentences that have nothing to do with their substantive response (such as "FORGIVE MY LOW VOICE, BUT I AM SICK WITH LARYNGITIS"). Some implementers of the FIG. 3 arrangement may conclude that as long as the user is speaking and making sense, it is possible that a proper response to the prompt eventually will be given. Accordingly, it would make sense for controller 140 to allow the user to continue speaking without reaching the conclusion that the user has failed to provide the requested input. Refraining from reaching this conclusion has little down side, since it merely postpones playing the secondary prompt, and it is possible that replaying the prompt would not be necessary.

The analysis that although meaningful phrases are not found but that the user is nevertheless speaking and making some sense is carried out in element 130. The conclusion that the user is making sense can be reduced to a simple determination that sentences are uttered which are generally grammatically correct. This may require a fair amount of processing in element 130, but the algorithms of analyzing sentences for grammatical correctness are well known. The processing can be reduced by simply maintaining a requirement that the speaker continue speaking in sentences that comprise recognizable words. That makes the analysis quite simple.

As before, silences are measured relative to the rate at which the user is speaking, so that a conclusion that the speaker has finished speaking is not made prematurely.

The above disclosure presents the principles of this invention by means of an illustrative embodiment. It should be realized, however, that various modifications and improvements are possible without departing from the spirit and scope of this invention. For example, elements 110 and 120 are described in terms of having the ability to deal with natural, unconstrained, speech and with DTMF signals. A slightly different embodiment might separate the two types of signals and treat them in different processing paths. Thus, recognizer 110 can first ascertain whether it is receiving a speech signal or a DTMF signal, and based on that decision, can send the signal to a different processing path. Similarly, element 120 would employ different processing based on whether the signal is speech or DTMF. Further, element 120, or element 130, can be imbued with the ability to detect the inflection of speech, since that assists in determining whether the speaker is asking question, or making a statement.

Figures 1, 2:
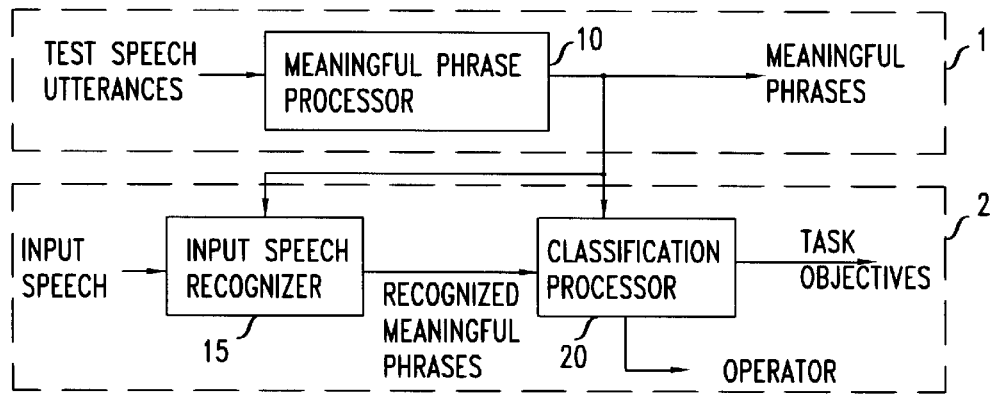
FIGS. 1 and 2 are duplicates of FIGS. 5 and 6, respectively, in the '193 patent.

Also, in discussing element 110 reference was made to the table of FIG. 2. This table, however, is constructed from a given corpus of data. Yet, most artisans would recognize that not all valid and meaningful sequences are likely to be found in such a corpus of data. For example, one would certainly not find the huge number of phrases that correspond to all of the possible telephone numbers. Clearly, therefore, the notion of a meaningful phrase developed in element 110 will have to include logic elements or processing elements (in addition to the mere look-up table) that allow a collection of individual digits to make up a meaningful phrase. The amount of logic or processing that is included in element 110 is strictly a function of the sophistication that an artisan who is implementing the FIG. 3 arrangement wishes to have.

It should be further noted that while the above disclosure is couched in terms of an improvement over a conventional interactive voice response system (where a user calls the system, seeking some service, and is presented with options, or choices, that the user makes in response to prompts) the principles disclosed herein are not so limited. For example, it is quite possible that a system employing the principles disclosed herein provides information rather than providing prompts as such. A ready example of such a system is one that "reads out" the e-mail of a user. Therefore, in reading the description and in reading the claims, it is to be understood that the word "prompt" and it variations are to be given their appropriate broad meaning.

Lastly, while the above disclosure concentrates on the unconstrained speech improvement to conventional VRUs that respond to DTMF prompts, it should be understood that other forms of signals send by the user which the VRU can recognize as valid user signals are also acceptable. This includes unconstrained digital signals that communicate information. This could be DTMF-based digital signals, digital signals that are modem-modulated into the voice band of port 100, and it could even be other digital signals that recognizer 110 is adapted to interpret. In the context of the claims that follow, the term "context" relates to the parts of sentence, paragraph, discourse, etc. that occur just before and after a specified word or passage, and determine its exact meaning. The phrase "grammatical construct" to the words employed in a sentence, and their position in a sentence, according to the rules of grammar.

We claim:

1. A method for communicating with a customer who communicates into a mouthpiece of telephone comprising the steps of:

applying a signal received by said mouthpiece to a preprocessing module that discards from said signal those components of said signal that fail to meet preselected usefulness criteria threshold test determined based on task-related speech of the speaker, resulting in an intermediate signal;

applying said intermediate signal to a phrase detector, to detect meaningful phrases within said intermediate signal; and supplying to a controller data that corresponds to detected meaningful phrases.

2. The method of claim 1 where said preprocessing module accepts analog signals.

3. The method of claim 1 where said preprocessing module accepts digital signals that result from an A/D conversion of analog signals.

4. The method of claim 1 where said preprocessing module is adapted to accept digital signals that result from an A/D conversion of analog signals, or analog signals.

5. The method of claim 1 where said preprocessing module is adapted to accept signals resulting from symbols modulating an analog carrier.

6. The method of claim 1 where said preprocessing module performs its usefulness criteria determination function in the presence of a prompt signal being delivered to said customer by performing a processing step that removes influence of said prompt from its usefulness criteria determination.

7. The method of claim 1 where said phrase detector carries out the step of analyzing context of detected phrases and determining from context whether said customer has completed sending information.

8. The method of claim 1 where signal components that are received by said mouthpiece that result from other than sounds made by said customer are said components of said signal that fail to meet preselected usefulness criteria.

9. A method for communicating with a customer who speaks to a mouthpiece of a telephone comprising the steps of:
analyzing a signal received by said mouthpiece to determine whether said signal meets preselected usefulness criteria threshold test determined based on task-related speech of the speaker;
applying to a phrase detector those components of said signal that meet said usefulness criteria, to detect meaningful phrases within said signal; and
supplying to a controller data that corresponds to said meaningful phrases.

10. The method of claim 9 where said usefulness criteria differentiate between noise and non-noise signals.

11. The method of claim 9 where said usefulness criteria differentiate between speech and non-speech signals.

12. The method of claim 9 where said usefulness criteria differentiate between speech that is related to telecommunication functions and speech that is unrelated to telecommunication functions.

13. The method of claim 9 where said usefulness criteria accept DTMF signals as signals that meet said usefulness criteria.

14. The method of claim 9 further comprising the steps of:
said controller determining that an action is to be taken, even before a silence period is detected in said incoming signal, and
said controller taking such action even before said silence period is detected in said incoming signal.

15. The method of claim 14 where said action is a prompt signal delivered to said customer.

16. The method of claim 14 where said action is a cutting off of a prompt signal delivered to said customer.

17. The method of claim 14 where said action is a stopping of a prompt signal delivered to customer.

18. The method of claim 9 where said processing step that removes influence is an echo canceling processing step.

19. The method of claim 9 where said phrase detector analyzes a rate at which words are detected, and lengths of silences between detected words, to control a determination that a response is completed.

20. The method of claim 9 where said phrase detector detects significant speech phrases through word spotting.

21. The method of claim 9 where said phrase detector analyzes inflection of detected words.

22. The method claim 9 where said phrase detector employs detected words and detected silences between words to ascertain likelihood that useful input in said incoming signal has ended.

23. The method claim 9 where said phrase detector carries out the steps of:
translating meaningful phrases found in said output signals of said recognizer into tasks to be provided to said controller, and
ascertaining lengths of silences between significant signal segments detected by said phrase detector to ascertain likelihood that useful input in said incoming signal has ended.

24. The method claim 9 where said phrase detector carries out the step of determining, from grammatical construct detected phrases, whether said customer has completed sending information.

25. The method of claim 9 where said signal received by said mouthpiece comprises one or more components from a set containing elements a, b, c, and d, where
element a is a signal component that results from sounds made by said customer and intended to communicate information to said mouthpiece,
element b is a signal component that results from sounds made by said customer that is not intended to communicate information to said mouthpiece,
element c is a signal component that results from non-speech sounds made by said customer, and
element d is a signal component that results from sounds made by other than said customer,
and where element a is the only element that meets said usefulness criteria.

* * * * *